United States Patent
Li et al.

(10) Patent No.: US 12,261,447 B2
(45) Date of Patent: Mar. 25, 2025

(54) ON-GRID/OFF-GRID SCHEDULING METHOD AND APPARATUS, AND ENERGY STORAGE POWER SUPPLY SYSTEM

(71) Applicant: Gree Electric Appliances, Inc. of Zhuhai, Guangdong (CN)

(72) Inventors: Weijin Li, Guangdong (CN); Yunhong Zeng, Guangdong (CN)

(73) Assignee: Gree Electric Appliances, Inc. of Zhuhai, Guangdong (CN)

(*) Notice: Subject to any disclaimer, the term of this patent is extended or adjusted under 35 U.S.C. 154(b) by 225 days.

(21) Appl. No.: 18/016,152

(22) PCT Filed: Sep. 8, 2021

(86) PCT No.: PCT/CN2021/117139
§ 371 (c)(1),
(2) Date: Jan. 13, 2023

(87) PCT Pub. No.: WO2022/142452
PCT Pub. Date: Jul. 7, 2022

(65) Prior Publication Data
US 2023/0283082 A1    Sep. 7, 2023

(30) Foreign Application Priority Data
Dec. 31, 2020  (CN) .......................... 202011640870.7

(51) Int. Cl.
*H02J 3/38*       (2006.01)
*H02J 3/32*       (2006.01)
(52) U.S. Cl.
CPC .............. *H02J 3/388* (2020.01); *H02J 3/32* (2013.01); *H02J 3/381* (2013.01)
(58) Field of Classification Search
CPC ... H02J 3/28–322; H02J 3/388; H02J 9/04–08
See application file for complete search history.

(56) References Cited

U.S. PATENT DOCUMENTS

| 2014/0306533 A1* | 10/2014 | Paquin ..................... H02J 3/46 307/43 |
| 2020/0343728 A1* | 10/2020 | Bagawade ............. H02J 3/381 |
| 2022/0011358 A1* | 1/2022 | Li ........................ G01R 31/086 |

FOREIGN PATENT DOCUMENTS

| CN | 103023132 A | 4/2013 |
| CN | 104319815 A | 1/2015 |

(Continued)

OTHER PUBLICATIONS

English machine translation of CN106353614A, published Jan. 25, 2017. (Year: 2017).*

(Continued)

*Primary Examiner* — Rexford N Barnie
*Assistant Examiner* — David A Shiao
(74) *Attorney, Agent, or Firm* — The Webb Law Firm (57) ABSTRACT

Disclosed are an on-grid/off-grid scheduling method and apparatus, and an energy storage power supply system. The method is applied to the system. The system includes an energy storage device; the energy storage device is connected to a direct current bus; one end of the direct current bus is connected to a power grid by means of an AC-DC module, and the other end is connected to a load. The method includes: after the energy storage device enters an off-grid operation mode, controlling an output voltage of the energy storage device to decrease once every first preset duration; and every time the output voltage of the energy storage device is controlled to decrease, obtaining an input voltage change situation of the load, and determining, according to the input voltage change situation of the load, whether to control the energy storage device to switch to an on-grid operation mode.

14 Claims, 2 Drawing Sheets

(56) References Cited

FOREIGN PATENT DOCUMENTS

| CN | 104333042 A | 2/2015 |
|---|---|---|
| CN | 106353614 A | 1/2017 |
| CN | 106849156 A | 6/2017 |
| CN | 108521140 A | 9/2018 |
| CN | 111245023 A | 6/2020 |
| CN | 211063355 U | 7/2020 |
| CN | 111864779 A | 10/2020 |
| CN | 112821435 A | 5/2021 |
| EP | 2632011 A1 | 8/2013 |
| WO | 2012142841 A1 | 10/2012 |
| WO | 2022142452 A1 | 7/2022 |

OTHER PUBLICATIONS

English machine translation of CN110165700A, published Aug. 23, 2019. (Year: 2019).*
English machine translation of CN111756066A, published Oct. 9, 2020. (Year: 2020).*

* cited by examiner

ON-GRID/OFF-GRID SCHEDULING METHOD AND APPARATUS, AND ENERGY STORAGE POWER SUPPLY SYSTEM

CROSS-REFERENCE TO RELATED APPLICATIONS

This present application is the United States National Phase of International Application No. PCT/CN2021/117139, filed on Sep. 8, 2021, and claims priority to Chinese Patent Application No. 202011640870.7 filed Dec. 31, 2020, the disclosures of which are hereby incorporated by reference in their entireties.

BACKGROUND OF THE INVENTION

Field of the Invention

The present disclosure discloses an on-grid/off-grid scheduling method and apparatus, and an energy storage power supply system.

Description of Related Art

The energy storage device in the energy storage power supply system may operate in an on-grid state or an off-grid state. When the energy storage power supply system is grid-on, the energy storage device operates in the on-grid state; and when the energy storage system is grid-off, the energy storage device operates in the off-grid state.

SUMMARY OF THE INVENTION

In the embodiments of the present disclosure, provided is an on-grid/off-grid scheduling method applied to an energy storage power supply system which comprises an energy storage device connected to a DC bus, one end of the DC bus being connected to a power grid through an AC-DC module, and the other end being connected to a load. The scheduling method comprises: controlling an output voltage of the energy storage device to drop once every a first preset duration interval, after the energy storage device enters an off-grid operation mode; and obtaining a change situation of an input voltage of the load after the output voltage of the energy storage device each time is controlled to drop, and determining whether to control the energy storage device to switch to an on-grid operation mode according to the change situation of the input voltage of the load.

In the embodiments of the present disclosure, provided is an on-grid/off-grid scheduling apparatus, applied to an energy storage power supply system which comprises an energy storage device connected to a DC bus, one end of the DC bus being connected to a power grid through an AC-DC module, and the other end being connected to a load. The scheduling apparatus comprises: a voltage dropping module configured to control an output voltage of the energy storage device to drop once every a first preset duration interval, after the energy storage device enters an off-grid operation mode; and a first control module configured to obtain a change situation of an input voltage of the load after the output voltage of the energy storage device each time is controlled to drop, and determine whether to control the energy storage device to switch to an on-grid operation mode according to the change situation of the input voltage of the load.

In the embodiments of the present disclosure, provided is a an on-grid/off-grid scheduling apparatus, comprising: a memory; and a processor coupled to the memory and configured to perform the on-grid/off-grid scheduling method according to any one of the above embodiments based on instructions stored in the memory.

In the embodiments of the present disclosure, provided is an energy storage power supply system, comprising: an energy storage device; an AC-DC module; a load; and the on-grid/off-grid scheduling apparatus according to any one of the above embodiments.

In the embodiments of the present disclosure, provided is a computer readable storage medium having a computer program stored thereon, wherein the computer program, when executed by a processor, implements the scheduling method according to any one of the above embodiments.

DESCRIPTION OF THE INVENTION

To make the objects, technical solutions, and advantages of the present disclosure clearer, some embodiments of the present disclosure will be described in detail in conjunction with the accompanying drawings below. Apparently, the described embodiments are merely some of the embodiments of the present disclosure, rather than all the embodiments. Based on the embodiments of the present disclosure, all the other embodiments obtained by those skilled in the art on the premise that no inventive effort is involved shall fall into the protection scope of the present disclosure.

The terms used in the embodiments of the present disclosure are only for the purpose of describing specific embodiments, rather than limiting the present disclosure. The singular forms of "a", "said" and "the" used in the embodiments of the present disclosure and the appended claims are also intended to comprise multiple forms, and the term "a plurality of" generally comprises at least two, unless other meanings are explicitly indicated in the context.

It should be understood that, the term "and/or" used herein is only an associated relationship to describe associated objects and means that there are three relationships. For example, A and/or B mean three cases of A presenting alone, A and B presenting at the same time, and B presenting alone. In addition, the character "/" herein generally indicates that the contextual objects are in an "or" relationship.

It should be understood that, although the terms such as first and second might be used to describe preset durations in the embodiments of the present disclosure, these preset durations should not be limited to these terms. These terms are only used to distinguish different preset durations. For example, without departing from the scope of the embodiments of the present disclosure, in some embodiments, the first preset duration is also referred to as the second preset duration, and similarly, the second preset duration is also referred to as the first preset duration.

Depending on the context, the words "if" and "in a case where" as used here is interpreted as "when", "at a certain time", "in response to the determination" or "in response to the detection". Similarly, depending on the context, the phrases "if it is determined" or "if it is detected (stated conditions or events)" is interpreted as "when it is determined", "in response to the determination" or "when it is detected (stated conditions or events)" or "in response to the detection (stated conditions or events)".

It should also be noted that, the terms "comprising", "containing" or any other variations thereof is intended to cover non-exclusive inclusions, so that a product or device that comprises a series of elements comprises not only those elements, but also other elements that are not explicitly listed, or elements inherent to such product or device. In a case where there are no more restrictions, an element defined by the phrase "comprising a . . . " does not exclude another identical element present in the product or device comprising the element.

In the art known by the inventors, the energy storage device distinguishes the on-grid state and the off-grid state of the energy storage power supply system by differentiating the on-grid/off-grid voltage, that is, the energy storage device distinguishes the on-grid/off-grid state of the energy storage power supply system by identifying the real-time change of the bus voltage. For example, when the bus voltage is a preset voltage, it is determined that the energy storage power supply system is in the on-grid state; and when the bus voltage is another preset voltage, it is determined that the energy storage power supply system is in the off-grid state.

The inventors have noticed that, in this manner, since the bus voltage may fluctuate, the on-grid/off-grid state of the energy storage device cannot be accurately controlled, which results in that the load cannot operate reliably.

The embodiments of the present disclosure will be described in detail below in conjunction with the accompanying drawings.

Figure 1:
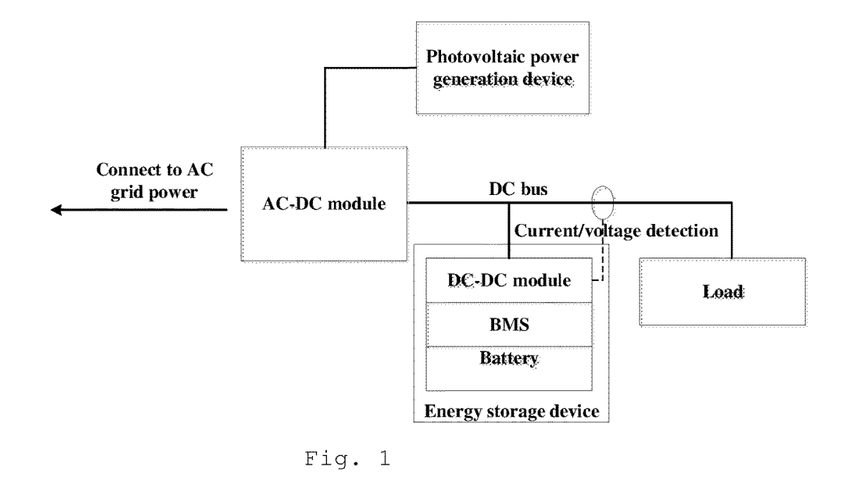
FIG. 1 is a structural view showing an energy storage power supply system according to some embodiments of the present disclosure.

The embodiments of the present disclosure provide an on-grid/off-grid scheduling method, which is applied to an energy storage power supply system. FIG. 1 is a structural view showing an energy storage power supply system according to some embodiments of the present disclosure. As shown in FIG. 1, the energy storage power supply system comprises an energy storage device. The energy storage device comprises a battery, a battery management system (BMS) and a DC-DC (direct current-direct current) module which comprises a DC-DC converter. The DC-DC module is connected to a DC bus. One end of the DC bus connected to a power grid through the AC-DC (alternating current-direct current) module which comprises an AC-DC converter, and the other end of the DC bus connected to a load which is a DC appliance.

In some embodiments, the energy storage power supply system also comprises a photovoltaic power generation device (PV device) connected to the AC-DC module to provide clean energy. AC-DC module is provided with a power grid interface and a photovoltaic interface and in some embodiments is connected to AC power grid and the photovoltaic power generation device at the same time.

Figure 2:
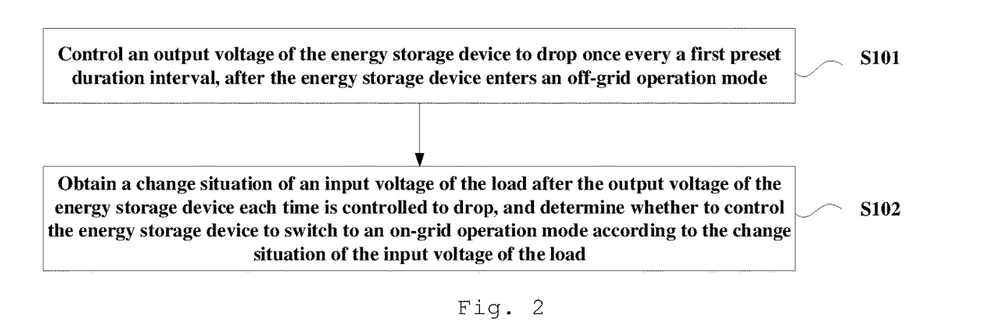
FIG. 2 is a flowchart of an on-grid/off-grid scheduling method according to some embodiments of the present disclosure.

FIG. 2 is a flowchart of an on-grid/off-grid scheduling method according to some embodiments of the present disclosure. As shown in FIG. 2, the scheduling method comprises step S101 and step S102.

In S101, an output voltage of the energy storage device is controlled to drop once every a first preset duration interval, after the energy storage device enters the off-grid operation mode.

In specific implementations, the dropping amplitude is set in advance. By controlling the dropping amplitude, after the output voltage of the energy storage device drops, the input voltage of the load is not lower than a minimum operation voltage of the load, for example, 95% of a target voltage.

In S102, a change situation of an input voltage of the load is obtained and whether to control the energy storage device to switch to the on-grid operation mode is determined according to the change situation of the input voltage of the load, after the output voltage of the energy storage device each time is controlled to drop.

If the energy storage power supply system is in the off-grid state (i.e., the power grid stops supplying power), the power supply of the load is the energy storage device. In this case, when the output voltage of the energy storage device drops, the input voltage of the load will also drop.

If the energy storage power supply system is in the on-grid state (the power grid does not stop supplying power), the load is powered by both the power grid and the energy storage device. In this case, the input voltage of the load will not fluctuate greatly. Therefore, based on the change situation of the input voltage of the load, whether the power grid stops supplying power can be determined, and whether to control the energy storage device to switch to the on-grid operation mode is further determined.

According to the on-grid/off-grid scheduling method in the embodiments of the present disclosure, after the energy storage device enters the off-grid operation mode, the output voltage of the energy storage device is controlled to drop once every a first preset duration interval; the change situation of the input voltage of the load is obtained after the output voltage of the energy storage device each time is controlled to drop, and whether to control the energy storage device to switch to the on-grid operation mode is determined according to the change situation of the input voltage of the load. In this way, the on-grid/off-grid state of the energy storage device can be accurately controlled, ensuring reliable operation of the load.

The embodiments of the present disclosure provide another on-grid/off-grid scheduling method. As described above, if the energy storage power supply system is in the off-grid state, the input voltage of the load will also drop accordingly after the output voltage of the energy storage device drops; and if the energy storage power supply system is in the on-grid state, the input voltage of the load will not fluctuate greatly. In some embodiments, the above step S102 specifically comprises: determining to control the energy storage device to switch to the on-grid operation mode if the input voltage of the load does not drop; and determining to control the energy storage device to remain in the off-grid operation mode, and controlling the output voltage of the energy storage device to return to a value of the output voltage before the output voltage drops, if the input voltage of the load drops.

The output of the AC-DC module can be stable after elapse of a startup duration. If the first preset duration is too short, and the system switches from the off-grid state to the on-grid state within an interval between the output voltage of the energy storage device drops in adjacent two times, but the output of the AC-DC module does not reach a stable state, it is still possible to detect that the input voltage of the load drops when the change of the input voltage of the load is detected in the second time of the two times. This results in that the energy storage device remains in the off-grid operation mode. However, at this time, the system has actually switched to the on-grid state. That is, the energy storage device cannot accurately switch between the on-grid state and the off-grid state. To avoid the above case, in some embodiments, in some embodiments, before controlling the output voltage of the energy storage device to drop once every a first preset duration interval, the method further comprises: obtaining a startup duration of the AC-DC module; and determining the first preset duration according to the startup duration. The first preset duration is greater than the startup duration, so that the AC-DC module can completely started within the interval between the output voltage of the energy storage device drops in adjacent two times, and it is ensured that the energy storage device can accurately switch between the on-grid state and the off-grid state.

The above steps are directed to the case where the energy storage device switches from the off-grid state to the on-grid state. In practical application, there is also a case where the energy storage device switches from the on-grid state to the off-grid state. For such a case, before the energy storage device enters the off-grid operation mode, the above method further comprises: obtaining the input voltage of the load once every a second preset duration interval; judging whether the deviation between the input voltage of the load and a target voltage is greater than a preset threshold, wherein the target voltage is the input voltage of the load before the energy storage device is connected to the DC bus; and controlling the energy storage device to enter the off-grid operation mode if the deviation is greater than the preset threshold. After the system is grid-off, the input voltage of the load will drop significantly. When the system is in the on-grid state, the input voltage of the load might also fluctuate slightly. To eliminate the influence of fluctuation, whether the deviation between the input voltage of the load and the target voltage is greater than the preset threshold (for example, 5% of the target voltage) is judged. If yes, it can be determined that what causes the input voltage of the load to drop significantly is the system is grid-off. The second preset duration described above is equal to or different from the first preset duration.

In order to make the input current of the load remain at the stable target current, after controlling the energy storage device to switch to the on-grid operation mode, the above method further comprises: obtaining the input current of the load; and judging whether the energy storage device is in a low-power protection state if the input current of the load is greater than zero and smaller than the target current, wherein the target current is the input current of the load before the energy storage device is connected to the DC bus. If the energy storage device is in the low-power protection state, it indicates that the power of the energy storage device is low, the output current of the energy storage device is controlled to be zero, and the energy storage device is controlled to switch to the on-grid standby state. If the energy storage device is not in the low-power protection state, it indicates that the power of the energy storage device is sufficient, and the output current of the energy storage device is controlled to increase to the target current.

If the input current of the load is equal to zero, it indicates that the load is not in operation, and the energy storage device may be charged at this time. Firstly, it is judged whether the energy storage device is in a fully charged state; the energy storage device is controlled to be grid-ON to be charged if the energy storage device is not in the fully charged state; and the energy storage device is controlled to switch to the on-grid standby state if the energy storage device is in the fully charged state.

Figure 3:
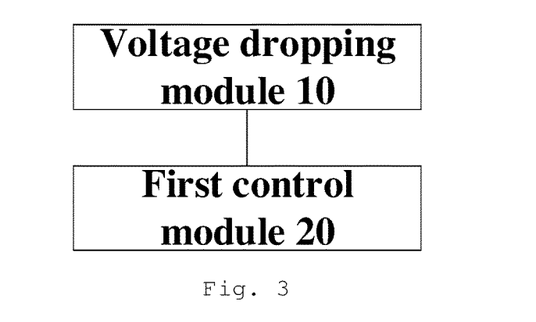
FIG. 3 is a structural view showing an on-grid/off-grid scheduling apparatus according to some embodiments of the present disclosure.

The embodiments of the present disclosure provide an on-grid/off-grid scheduling apparatus, which is applied to the above on-grid/off-grid scheduling method. FIG. 3 is a structural view showing the on-grid/off-grid scheduling apparatus according to some embodiments of the present disclosure. As shown in FIG. 3, the scheduling apparatus comprises a voltage dropping module 10 configured to control the output voltage of the energy storage device to drop once every a first preset duration interval after the energy storage device enters the off-grid operation mode.

In specific implementations, the dropping amplitude is set in advance. By controlling the dropping amplitude, after the output voltage of the energy storage device drops, the input voltage of the load is not lower than the minimum operation voltage of the load, for example, 95% of a target voltage.

The scheduling apparatus also comprises a first control module 20 configured to obtain the change situation of the input voltage of the load after the output voltage of the energy storage device each time is controlled to drop and determine whether to control the energy storage device to switch to the on-grid operation mode according to the change situation of the input voltage of the load.

If the energy storage power supply system is in the off-grid state, the power supply of the load is the energy storage device. When the output voltage of the energy storage device drops, the input voltage of the load will also drop accordingly. If the energy storage power supply system is in the on-grid state, the input voltage of the load will not fluctuate greatly. Therefore, based on the change situation of the input voltage of the load, whether the power grid stops supplying power can be determined, and then whether to control the energy storage device to switch to the on-grid operation mode is determined.

It is to be noted that, in specific implementations, the functions of the voltage dropping module 10 and the first control module 20 are integrated inside the energy storage device, for example, voltage dropping control, voltage detection, and on-grid/off-grid mode switching control are realized by the DC-DC module in the energy storage device.

In the on-grid/off-grid scheduling apparatus according to the embodiments of the present disclosure, the voltage dropping module 10 controls the output voltage of the energy storage device to drop once every a first preset duration interval after the energy storage device enters the off-grid operation mode; the first control module 20 obtains the change situation of the input voltage of the load after the output voltage of the energy storage device each time is controlled to drop, and determines whether to control the energy storage device to switch to the on-grid operation mode according to the change situation of the input voltage of the load. The on-grid/off-grid state of the energy storage device can be accurately controlled, ensuring reliable operation of the load.

In the art known by the inventors, on-grid/off-grid detection is performed by a communication method, that is, the front-end grid-on device (for example, an AC-DC module) sends an on-grid/off-grid instruction to the energy storage device to inform the energy storage device of a current operation state of the energy storage power supply system. The communication method is present with an unreliable problem resulting from communication interference.

The on-grid/off-grid scheduling apparatus according to some embodiments of the present disclosure is located in the energy storage device, thereby avoiding the unreliable problem resulting from communication interference.

Figure 4:
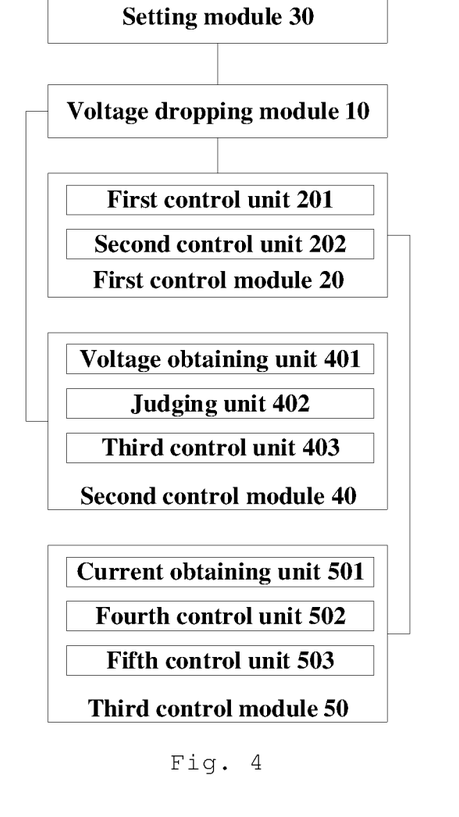
FIG. 4 is a structural view showing an on-grid/off-grid scheduling apparatus according to other embodiments of the present disclosure.

The embodiments of the present disclosure provide another on-grid/off-grid scheduling apparatus. FIG. 4 is a structural view showing an on-grid/off-grid scheduling apparatus according to other embodiments of the present disclosure. As mentioned above, if the energy storage power supply system is in the off-grid state, after the output voltage of the energy storage device drops, the input voltage of the load will also drop accordingly; and if the energy storage power supply system is in the on-grid state, the input voltage of the load will not fluctuate greatly. Therefore, to accurately switch the operation mode of the energy storage device, the first control module 20 comprises a first control unit 201 and a second control unit 202.

The first control unit 201 is configured to determine to control the energy storage device to switch to the on-grid operation mode in a case where the input voltage of the load does not drop. The second control unit 202 is configured to determine to control the energy storage device to remain in the off-grid operation mode and control the output voltage of the energy storage device to return to a value of the output voltage before being controlled to drop in a case where the input voltage of the load drops.

The output of the AC-DC module will be stable after elapse of a startup duration. If the first preset duration is too short, and the system switches from the off-grid state to the on-grid state within an interval between the output voltage of the energy storage device drops in adjacent two times, but the output of the AC-DC module does not reach a stable state, it is still possible to detect that the input voltage of the load drops when the change of the input voltage of the load is detected in the second time of the two times. This results in that the energy storage device remains in the off-grid operation mode. However, at this time, the system has actually switched to the on-grid state. That is, the energy storage device cannot accurately switch between the on-grid state and the off-grid state. To avoid the above case, the above device further comprises a setting module 30 configured to obtain a startup duration of the AC-DC module and determine a first preset duration according to the startup duration. The first preset duration is greater than the startup duration, so that the AC-DC module can completely started within the interval between the output voltage of the energy storage device drops in adjacent two times, and it is ensured that the energy storage device can accurately switch between the on-grid state and the off-grid state.

The above steps are directed to the case where the energy storage device switches from the off-grid state to the on-grid state. In practical application, there is also a case where the energy storage device switches from the on-grid state to the off-grid state. For such a case, the above device also comprises a second control module 40 which comprises: a voltage obtaining unit 401 configured to obtain the input voltage of the load once every a second preset duration interval before the energy storage device enters the off-grid operation mode; a judging unit 402 configured to judge whether the deviation between the input voltage of the load and a target voltage is greater than a preset threshold, wherein the target voltage is the input voltage of the load before the energy storage device is connected to the DC bus; and a third control unit 403 configured to control the energy storage device to enter the off-grid operation mode in a case where the deviation between the input voltage of the load and the target voltage is greater than a preset threshold. After the system is grid-off, the input voltage of the load will drop significantly. When the system is in the on-grid state, the input voltage of the load might also fluctuate slightly. To eliminate the influence of fluctuation, whether the deviation between the input voltage of the load and the target voltage is greater than the preset threshold (for example, 5% of the target voltage) is judged. If yes, it can be determined that what causes the input voltage of the load to drop significantly is the system is grid-off.

To make the input current of the load remain at the stable target current, the above device further comprises a third control module 50 which comprises a current obtaining unit 501 and a fourth control unit 502. The current obtaining unit 501 is configured to obtain the input current of the load after the energy storage device is controlled to switch to the on-grid operation mode. The fourth control unit 502 is configured to judge whether the energy storage device is in a low-power protection state in a case where the input current of the load is greater than zero and smaller than a target current, wherein the target current is the input current of the load before the energy storage device is connected to the DC bus; control the output current of the energy storage device to be zero and control the energy storage device to switch to the on-grid standby state, if the energy storage device is in the low-power protection state; and control the output current of the energy storage device to increase to the target current if the energy storage device is not in the low-power protection state.

In some embodiments, the third control module 50 further comprises a fifth control unit 503 configured to determine whether the energy storage device is in a fully charged state in a case where the input current of the load is equal to zero; control the energy storage device to be grid-on to be charged if the energy storage device is not in the fully charged state; and control the energy storage device to switch to the on-grid standby state if the energy storage device is in the low-power protection state.

The embodiments of the present disclosure provide another on-grid/off-grid scheduling method, which is applied to an energy storage power supply system. The structure of the energy storage power supply system in the embodiments of the present disclosure is shown in FIG. 1 mentioned above, and comprises an AC-DC module, an energy storage device and a load which is a DC appliance. The energy storage device comprises a battery, a BMS and a DC-DC module, and the energy storage device is provided with a voltage detection interface and a current detection interface.

The above energy storage power supply system also comprises a photovoltaic power generation device. The photovoltaic power generation device is connected to the AC-DC module to provide clean energy. The AC-DC module which is provided with a power grid interface and a photovoltaic interface, in some embodiments is connected to the power grid and the photovoltaic power generation device at the same time.

The on-grid/off-grid scheduling method according to other embodiments of the present disclosure specifically comprises steps S1-S4.

In S1, after an energy storage system (for example, the above energy storage device) is connected to the DC bus, the input voltage of the load and the input current of the load are detected, the detection value of the input voltage of the load is recorded and stored in the DC-DC module, and the detection value of the input voltage is set to be the target voltage value U0 for off-grid operation and the input current is set to be the target current I0 for on-grid operation.

In S2, when the energy storage system is in on-grid operation, the DC-DC module monitors the input voltage of the load in real time. When the input voltage of the load drops to a lower limit value of the operation voltage of the load (for example, 95% of the target voltage value U0), the energy storage system judges that the energy storage power supply system switches from the on-grid state to the off-grid state. Further, an on-grid/off-grid flag bit is set to be 1, and the energy storage system enters the off-grid operation mode. The DC-DC module adjusts the output voltage of the to stabilize the input voltage of the load at the target voltage value U0.

In S3, when the energy storage system is in off-grid operation, the DC-DC module outputs a corresponding power according to the power of the load and determines a first preset duration according to a power-on startup duration of the AC-DC module, wherein the first preset duration is greater than the power-on startup duration of the AC-DC module. Every a first preset duration interval, the output voltage of the DC-DC module drops once. The dropping amplitude is set according to the lower limit value of the operation voltage range of the DC appliance, for example, dropping 5% of the target voltage value U0. At the same time, the DC-DC module detects the input voltage of the load. When the bus voltage drops synchronously with the same magnitude, it is judged to be currently in the off-grid state, and the output voltage of the DC-DC module returns to the value before dropping. When the bus voltage does not drop, it is judged to be currently in the on-grid state, and the energy storage system switches to the on-grid operation mode, and the on-grid flag bit is zero cleared.

In S4, after the energy storage system is in on-grid state operation, the DC-DC module monitors the input current I of the load in real time. When 0<I≤I0, the battery management system BMS detects whether it is in a low-power protection state. If no, the output current of the energy storage system DC-DC module is gradually increased from 0 to I0. If yes, the energy storage system is in on-grid standby state. When I=0, BMS detects its own power. If the battery is fully charged, the output of the energy storage system is zero, and the energy storage system in on-grid standby state. If the battery is not fully charged, the energy storage system starts to be grid-on for charging, and the DC-DC module charges the battery.

The embodiments of the present disclosure provide another on-grid/off-grid scheduling apparatus, which comprises a memory and a processor coupled to the memory. The processor is configured to perform the on-grid/off-grid scheduling method according to any of the above embodiments based on the instructions stored in the memory.

The embodiments of the present disclosure provide an energy storage power supply system, which comprises an energy storage device, an AC-DC module, and a load, wherein the energy storage device comprises the on-grid/off-grid scheduling apparatus according to any of the above embodiments. The energy storage system is configured to accurately control the on-grid/off-grid state of the energy storage device and ensure reliable operation of the load.

The embodiments of the present disclosure provide a computer readable storage medium having a computer program stored thereon, the computer program, when executed by a processor, implements the on-grid/off-grid scheduling method in any one of the above embodiments.

The scheduling apparatus embodiments described above are only schematic. The units described as separate components are physically divided or not physically divided, and the components displayed as units are physical units or not physical units, that is, they are located in a place or distributed in multiple network units. Some or all of the modules are selected to achieve the object of the solution in the embodiments of the present disclosure according to actual needs.

From the above illustrations of the embodiments, those skilled in the art can be explicitly appreciated that, various embodiments are implemented by means of software and a general-purpose hardware platform in some embodiments, and of course, are implemented by hardware in other embodiments. Based on such understanding, the above technical solutions essentially or part of the above technical solutions contributing to the prior art are embodied in the form of a software product in some embodiments. The computer software product is stored in a computer-readable storage medium in some embodiments, such as ROM/RAM, magnetic disk, or optical disk, and comprises several instructions to cause a computer device (which is a personal computer, a server, or a network device and the like) to implement the method described in various embodiments or in a part of an embodiment.

Finally, it is to be noted that, the above embodiments are only for describing the technical solutions of the present disclosure, rather than limiting the same. Although the present disclosure has been described in detail in conjunction with the foregoing embodiments, those skilled in the art should understand that, it is still possible to modify the technical solutions recited in the foregoing various embodiments or make equivalent substitutions to some of the technical features. These modifications or substitutions do not make the essence of the corresponding technical solutions depart from the spirit and scope of the technical solutions in various embodiments of the present disclosure.

What is claimed is:

1. An on-grid/off-grid scheduling method, applied to an energy storage power supply system which comprises an energy storage device connected to a DC bus, one end of the DC bus being connected to a power grid through an AC-DC module, and the other end being connected to a load, the scheduling method comprising:

obtaining a startup duration of the AC-DC module, wherein an output of the AC-DC module is stable after elapse of the startup duration;

determining a first preset duration interval according to the startup duration, wherein the first preset duration interval is greater than the startup duration;

controlling an output voltage of the energy storage device to drop once every the first preset duration interval, after the energy storage device enters an off-grid operation mode; and obtaining a change situation of an input voltage of the load after the output voltage of the energy storage device each time is controlled to drop and determining whether to control the energy storage device to switch to an on-grid operation mode according to the change situation of the input voltage of the load, comprising:

determining to control the energy storage device to switch to the on-grid operation mode if the input voltage of the load does not drop, and determining to control the energy storage device to remain in the off-grid operation mode and controlling the output voltage of the energy storage device to return to a value of the output voltage before being dropped if the input voltage of the load drops, wherein in the off-grid operation mode, the power grid stops supplying power, and the energy storage device supplies power to the load, and wherein in the on-grid operation mode, both the power grid and the energy storage device supplies power to the load.

2. The scheduling method according to claim 1, wherein before the energy storage device enters the off-grid operation mode, the scheduling method further comprises:
obtaining the input voltage of the load once every a second preset duration interval;
judging whether a deviation between the input voltage of the load and a target voltage is greater than a preset threshold, wherein the target voltage is the input voltage of the load before the energy storage device is connected to the DC bus; and
controlling the energy storage device to enter the off-grid operation mode if the deviation is greater than the preset threshold.

3. The scheduling method according to claim 1, wherein after controlling the energy storage device to switch to the on-grid operation mode, the scheduling method further comprises:
obtaining an input current of the load;
judging whether the energy storage device is in a low-power protection state if the input current of the load is greater than zero and smaller than a target current, wherein the target current is the input current of the load before the energy storage device is connected to the DC bus;
controlling an output current of the energy storage device to be zero, and controlling the energy storage device to switch to an on-grid standby state if the energy storage device is in the low-power protection state; and
controlling the output current of the energy storage device to increase to the target current if the energy storage device is not in the low-power protection state.

4. The scheduling method according to claim 3, wherein after obtaining the input current of the load, the scheduling method further comprises:
judging whether the energy storage device is in a fully charged state if the input current of the load is equal to zero;
controlling the energy storage device to be grid-on to be charged if the energy storage device is not in the fully charged state; and
controlling the energy storage device to switch to the on-grid standby state if the energy storage device is in the fully charged state.

5. A non-transitory computer readable storage medium having a computer program stored thereon, wherein the computer program, when executed by a processor, implements the scheduling method according to claim 1.

6. An on-grid/off-grid scheduling apparatus, applied to an energy storage power supply system which comprises an energy storage device connected to a DC bus, one end of the DC bus being connected to a power grid through an AC-DC module, and the other end being connected to a load, the scheduling apparatus comprising:
a memory; and
a processor coupled to the memory and configured to, based on instructions stored in the memory, obtain a startup duration of the AC-DC module, determine a first preset duration interval greater than the startup duration according to the startup duration, control an output voltage of the energy storage device to drop once every the first preset duration interval after the energy storage device enters an off-grid operation mode, obtain a change situation of an input voltage of the load after the output voltage of the energy storage device each time is controlled to drop and determine whether to control the energy storage device to switch to an on-grid operation mode according to the change situation of the input voltage of the load, wherein an output of the AC-DC module is stable after elapse of the startup duration,
wherein the processor is configured to control the energy storage device to switch to the on-grid operation mode in a case where the input voltage of the load does not drop, and determine to control the energy storage device to remain in the off-grid operation mode and control the output voltage of the energy storage device to return to a value of the output voltage before being dropped in a case where the input voltage of the load drops,
wherein in the off-grid operation mode, the power grid stops supplying power, and the energy storage device supplies power to the load, and
wherein in the on-grid operation mode, both the power grid and the energy storage device supplies power to the load.

7. An energy storage power supply system, comprising:
the on-grid/off-grid scheduling apparatus according to claim 6;
the energy storage device;
the AC-DC module; and
the load.

8. The energy storage power supply system according to claim 7, wherein the on-grid/off-grid scheduling apparatus is located in the energy storage device.

9. The on-grid/off-grid scheduling apparatus according to claim 6, wherein the processor is further configured to:
obtain the input voltage of the load once every a second preset duration interval before the energy storage device enters the off-grid operation mode;
judge whether a deviation between the input voltage of the load and a target voltage is greater than a preset threshold, wherein the target voltage is the input voltage of the load before the energy storage device is connected to the DC bus; and
control the energy storage device to enter the off-grid operation mode in a case where the deviation between the input voltage of the load and the target voltage is greater than the preset threshold.

10. An energy storage power supply system, comprising:
the on-grid/off-grid scheduling apparatus according to claim 9;
the energy storage device;
the AC-DC module; and
the load.

11. The on-grid/off-grid scheduling apparatus according to claim 6, wherein the processor is further configured to:
obtain the input current of the load after the energy storage device is controlled to switch to the on-grid operation mode; and
judge whether the energy storage device is in a low-power protection state in a case where the input current of the load is greater than zero and smaller than a target current, wherein the target current is the input current of the load before the energy storage device is connected to the DC bus;
control an output current of the energy storage device to be zero, and control the energy storage device to switch to an on-grid standby state if the energy storage device is in the low-power protection state; and control the output current of the energy storage device to increase to the target current if the energy storage device is not in the low-power protection state.

12. The on-grid/off-grid scheduling apparatus according to claim 11, wherein the processor is further configured to:
judge whether the energy storage device is in a fully charged state if the input current of the load is equal to zero;
control the energy storage device to be grid-on to be charged if the energy storage device is not in the fully charged state; and
control the energy storage device to switch to the on-grid standby state if the energy storage device is in the fully charged state.

13. An energy storage power supply system, comprising:
the on-grid/off-grid scheduling apparatus according to claim 12;
the energy storage device;
the AC-DC module; and
the load.

14. An energy storage power supply system, comprising:
the on-grid/off-grid scheduling apparatus according to claim 11;
the energy storage device;
the AC-DC module; and
the load.

* * * * *